United States Patent
Kondo

(10) Patent No.: US 6,888,902 B1
(45) Date of Patent: May 3, 2005

(54) DIGITAL VARIABLE FREQUENCY OSCILLATOR

(75) Inventor: Tomokazu Kondo, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 492 days.

(21) Appl. No.: 09/587,062

(22) Filed: Jun. 2, 2000

(30) Foreign Application Priority Data

Jun. 4, 1999 (JP) .......................................... 11-158108

(51) Int. Cl.[7] .......................................... H04L 27/152
(52) U.S. Cl. ...................... 375/344; 375/362; 375/371; 327/159; 327/160; 331/1 A; 331/1 R; 331/DIG. 3
(58) Field of Search ................................. 375/344, 362, 375/371; 327/3, 7, 8, 141, 159, 160; 331/1 A, 1 R, DIG. 3; 360/30, 39, 51

(56) References Cited

U.S. PATENT DOCUMENTS 5,677,648 A * 10/1997 Jones ........................... 331/17
5,903,197 A * 5/1999 Kikugawa ..................... 331/17
5,939,947 A * 8/1999 Nakao et al. .................. 331/11

FOREIGN PATENT DOCUMENTS

| JP | 3-227123 | 10/1991 |
| JP | 5-303706 | 11/1993 |

OTHER PUBLICATIONS

Newton's Telecom Dictionary, 14th Uptated & Expanded Eddition, p. 218.*

* cited by examiner

Primary Examiner—Dac V Ha
(74) Attorney, Agent, or Firm—Foley & Lardner LLP

(57) ABSTRACT

Disclosed is a digital variable oscillator which has: a cycle change detector for detecting the change of cycle between two input data; a decoder for outputting a predetermined signal in relation to the detection result of the cycle detector; an adder for adding signal output from the decoder a predetermined time; and a frequency adjuster for adjusting the frequency of window signal in relation to the addition result of the adder.

9 Claims, 6 Drawing Sheets

3 ; SUBTRACTER
13 ; COMPARATOR
14 ; ADDER 23, 24, 32, 33, 36 ; SELECTOR

DIGITAL VARIABLE FREQUENCY OSCILLATOR

FIELD OF THE INVENTION

This invention relates to a digital variable frequency oscillator (VFO) to conduct the frequency correction in playing back serial data, and more particularly to, a digital VFO that detects a variation in frequency of input data and allows an optimum frequency to be generated, with a simple composition.

BACKGROUND OF THE INVENTION

Digital variable frequency oscillators (hereinafter referred to as "VFO") have been used to play back, e.g., data of magnetic recording disk. In general, VFO is built with an analogue circuit. However, the analogue circuit is hard to design since the tuning of resistance value and capacitance value with each other is required. Also, it is difficult to reduce the area of chip in the analogue circuit.

Therefore, recently, the digitalization of VFO has been desired. In reply to the desire, for example, a digital VFO using a counter has been suggested in Japanese patent application laid-open No.03-227123 (1991).

FIG. 1 is a block diagram showing the conventional VFO disclosed in Japanese patent application laid-open No. 03-227123. In the conventional VFO, there is provided a normalization circuit 32 to generate reference data with one clock width in reference clock from playback data 31 by a reference clock. Here, playback data 31 is the signal to be output from, e.g. a floppy disk drive device. Also, there is provided a counter 33 that is a binary counter with a reset function to increase the counter value by the reference clock. MSB of the counter 33 means its most significant bit. Further, there is provided a D-type flip-flop 34 to generate output clock by dividing output of the counter 33 into two. From the D-type flip-flop 34, output clock is output as window pulse.

In the conventional VFO thus composed, for example, when the transfer rate of data is 500 kbps and the frequency of reference clock is 12 MHz, the counter value is set to be six so that playback data comes to the center of the high width or low width of the output clock every time playback data is input, thereby the phase compensation is conducted quickly. Meanwhile, the ideal cycle of the counter 33 to generate the output clock is 12 in the decimal system.

FIG. 2 is a timing chart showing an example of erroneous correction to a pair of peak shifts. In FIG. 2, solid lines indicate the output clock that is corrected erroneously, and dotted lines indicate the output clock in a case that the correction of output is not conducted. Here, data to be played back is "11", and shown is a case that both of the bits are subject to peak shift where they shift off to the right or left side from the center. Essentially, when playback data arises, the output clock has to be output at a high timing referenced to the output clock. But, as shown in FIG. 2, in the conventional VFO, when the peak shift occurs in playback data, the timing of output clock at the arising of playback.

SUMMARY OF THE INVENTION

Accordingly, it is an object of the invention to provide a digital variable frequency oscillator that can generate window signal not influenced by peak shift with a simple composition.

According to the invention, a digital variable oscillator, comprises:

a cycle change detecting means for detecting the change of cycle between two input data;

a decoder that outputs a predetermined signal in relation to the detection result of the cycle detecting means;

an adding means for adding signal output from the decoder a predetermined time; and a frequency adjusting means for adjusting the frequency of window signal in relation to the addition result of the adding means.

In this invention, a pair of peak shifts can cancel out between two input data since the peak shift of input data occurs always yielding a pair. Therefore, the window signal can be generated without being influenced by the peak shift.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
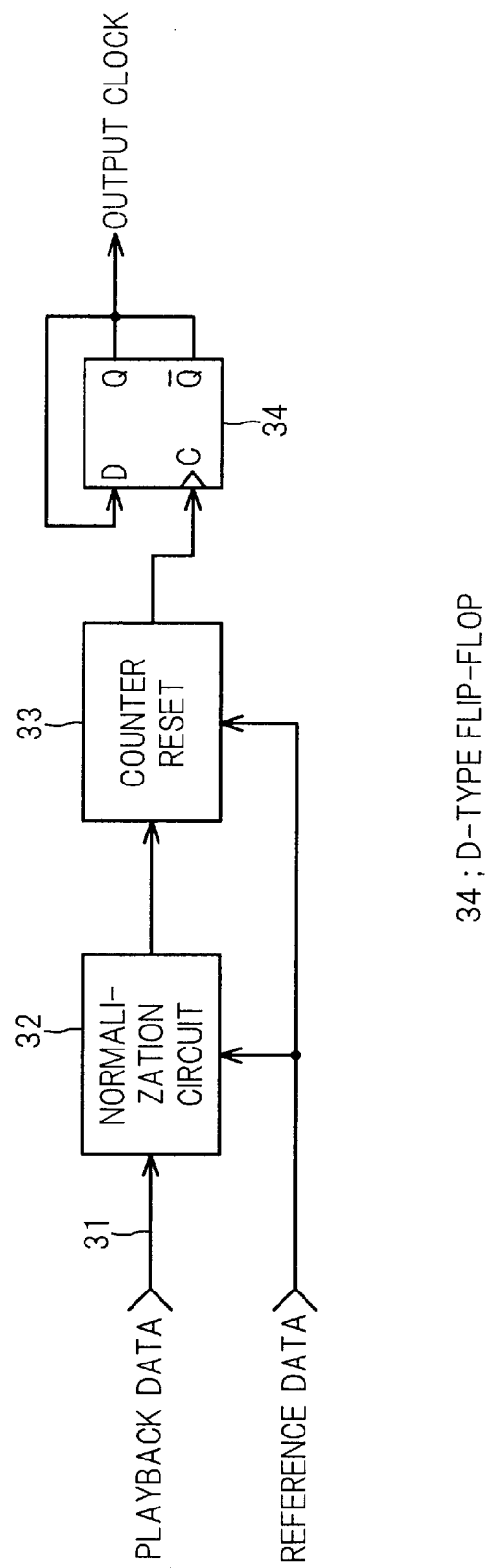
FIG. 1 is a block diagram showing the conventional VFO disclosed in Japanese patent application laid-open No.03-227123.
Figure 2:
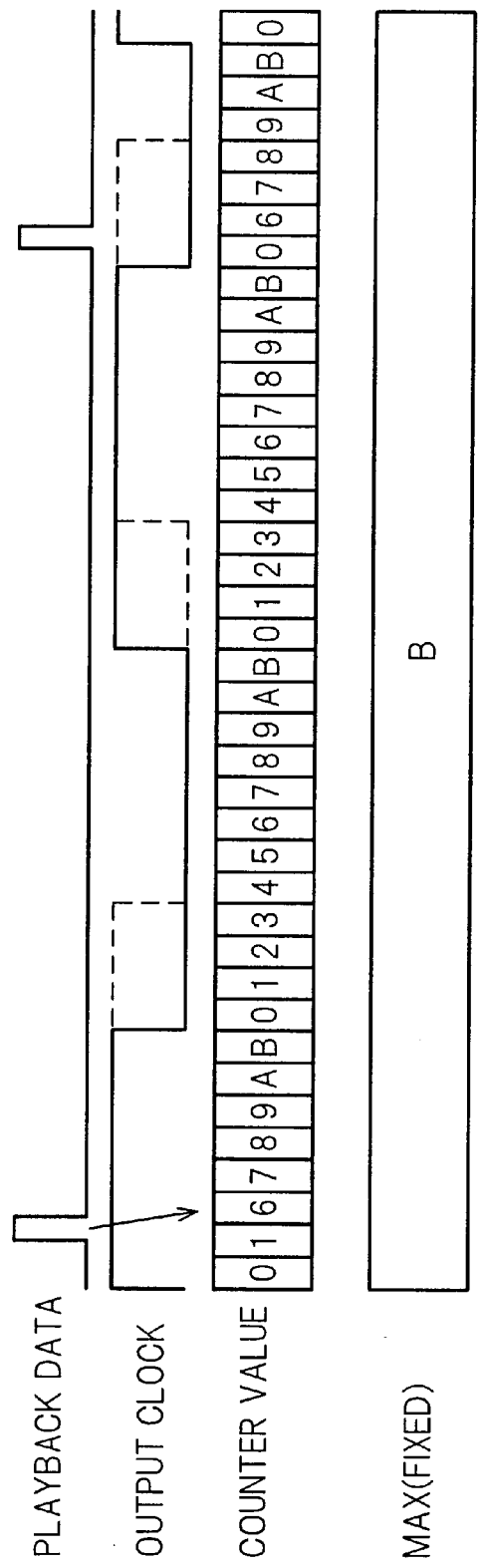
FIG. 2 is a timing chart showing an example of erroneous correction to a pair of peak shifts.

A digital variable oscillator in the preferred embodiment according to the invention will be explained referring to the drawings.

Figure 3:
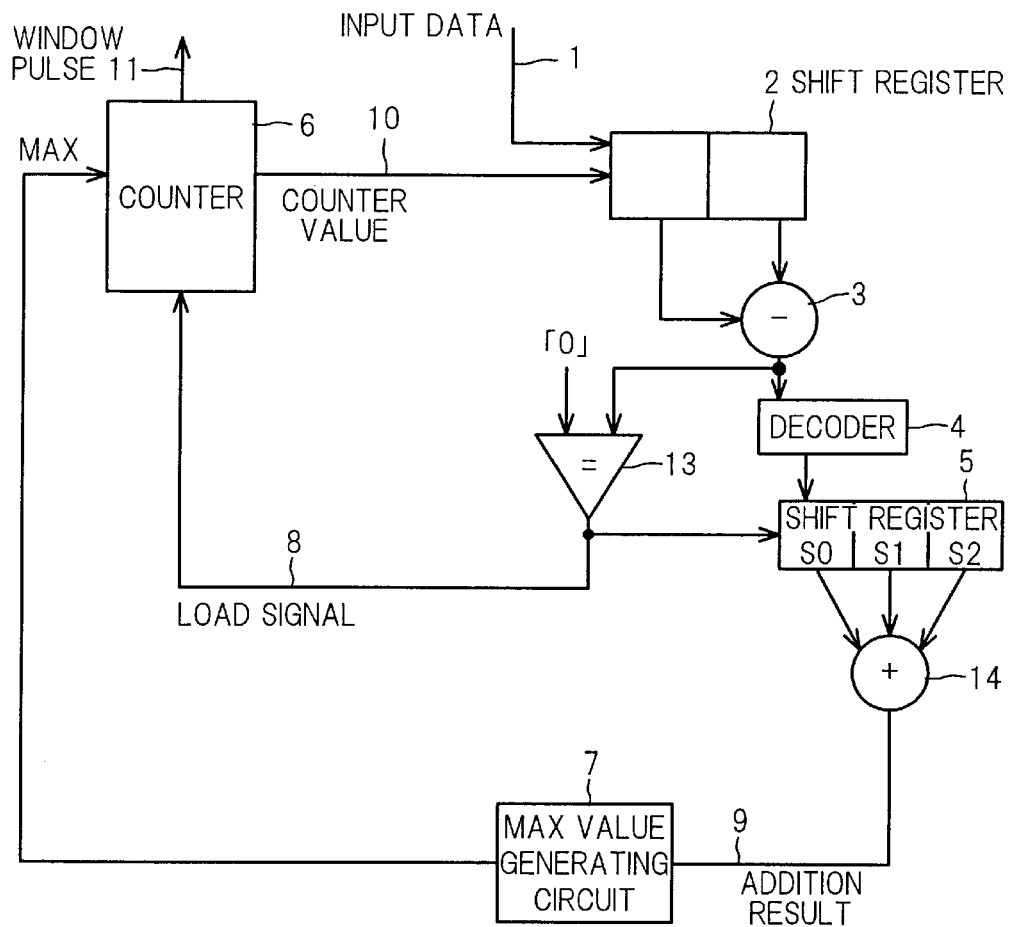
FIG. 3 is a block diagram showing a digital variable frequency oscillator (VFO) in a preferred embodiment according to the invention.

FIG. 3 is a block diagram showing the composition of the digital variable oscillator in the embodiment according to the invention. In this embodiment, a shift register 2 to which input data 1 is input is provided. The shift register 2 is capable of retaining two numbers. Also provided is a subtracter 3 that subtracts a number at the high-order digit from a number at the low-order digit in the register 2. Further, a counter 6 that generates a counter value 10 when input data 1 arises is provided. The counter value 10 is substituted for into the low-order digit, and a value stored until then at the low-order digit is shifted into the high-order digit. The cycle change detecting means includes the shift register 2 and the subtracter 3.

Further, a decoder 4 that generates a number to be stored in a shift register 5 in relation to the subtraction result of the subtracter 3 is provided. For example, when the influence of peak shift is strong and therefore it is desirable to determine the cycle of window pulse without being influenced thereby, the decoder 4 is designed so that, independently of the absolute vale of subtraction result by the subtracter 3, it generates +1 or −1 from the sign. When the influence of peak shift is weak and it is rather desirable to follow the frequency deviation quickly, the decoder 4 is designed so that it outputs a value weighted according to the absolute value of the subtraction result. However, the decoder 4 is not limited to these.

Furthermore, provided is a comparator 13 that compares the subtraction result of the subtracter 3 with zero and, when the subtraction result of the subtracter 3 corresponds to zero, generates load signal 8. Also, provided is the shift register 5 that, when input data 1 arises, the output of the decoder 4 is stored in the lowest-order digit and numbers stored until then in each digits shift sequentially to the higher-order digits. Further, an adder 14 adds together numbers stored in the respective digits of the shift register 5. The phase control means includes a comparator 13, and the adding means includes the shift register 5 and the adder 14.

Also, provided is a MAX value generating circuit 7 that, when an addition result 9 of the adder 14 reaches a predetermined reference value, adds "1" to a maximum value MAX or subtracts "1" from that. The frequency adjusting means includes the MAX value generating circuit 7 and the counter 6.

Meanwhile, to each block, a system clock is always input from outside.

Examples of the detailed composition of the MAX value generating circuit 7 and the counter 6 are explained below.

Figure 4A:
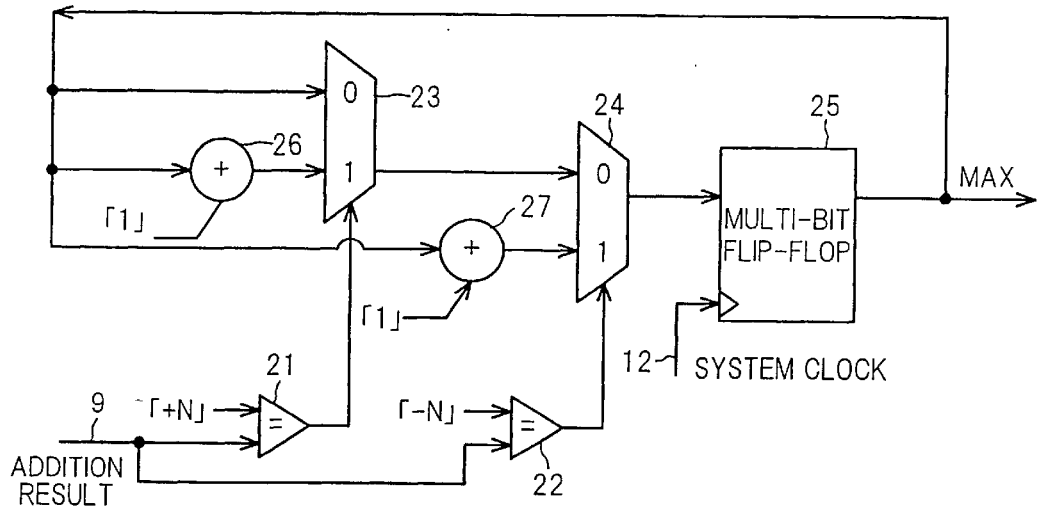
FIG. 4A is a block diagram showing the composition of a MAX value generating circuit 7 in FIG. 3.
Figure 4B:
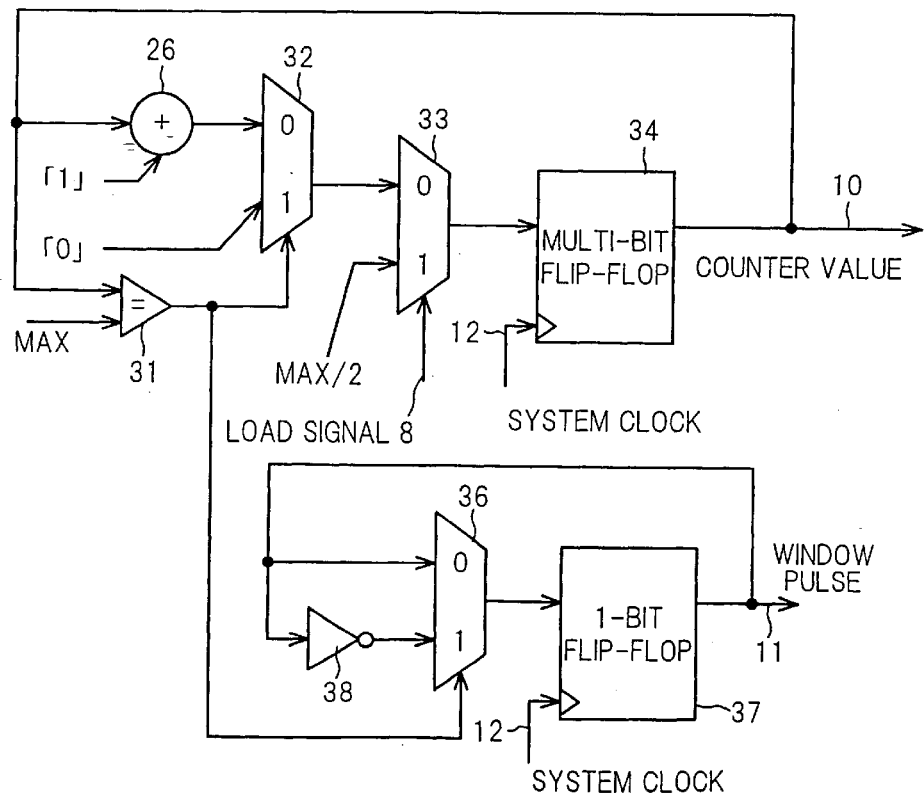
FIG. 4B is a block diagram showing the composition of a counter 6 in FIG. 3.

FIG. 4A is a block diagram showing the composition of the MAX value generating circuit 7, and FIG. 4B is a block diagram showing the composition of the counter 6.

The MAX value generating circuit 7 is equipped with a comparator 21 that compares the addition result 9 with a reference value "+N", and a comparator 22 that compares the addition result 9 with a reference value "−N". Also, the MAX value generating circuit 7 is equipped with a selector 23 that outputs an output signal based on the comparison result of the comparator 21, and a selector 24 that outputs an output signal based on the comparison result of the comparator 22. Further, it is equipped with a multi-bit flip-flop 25 that operates based on system clock 12 and outputs a maximum value MAX in relation to output signal of the selector 24.

Also, it is equipped with an adder 26 that adds "1" to the maximum value MAX, and a subtracter 27 that subtracts "1" from the maximum value MAX. To the selector 23, the output signal of the adder 26 is input. To the selector 24, the output signals of the subtracter 27 and the selector 23 are input.

On the other hand, the counter 6 is equipped with a comparator 31 that compares a maximum value MAX output from the MAX value generating circuit 7 with a counter value 10. Also, a selector 32 that outputs an output signal based on the comparison result of the comparator 31 is provided. Also, a selector 33 that outputs an output signal based on load signal 8 output from the comparator 13 is provided. Further, a multi-bit flip-flop 34 that operates based on system clock 12 and outputs a counter value 10 in relation to output signal of the selector 33 is provided.

Also, an adder 35 that adds "1" to the counter value 10 is provided. To the selector 32, the output signal of the adder 35 and a value "0" are input. Also, to the selector 33, the output signal of the selector 32 and a half of the maximum value MAX "MAX/2" are input.

Further, the counter 6 is equipped with a selector 36 that outputs the output signal based on the comparison result of the comparator 31. Also, a 1-bit flip-flop 37 that operates based on system clock 12 and outputs a window pulse (window signal) 111 in relation to output signal of the selector 36 is provided. Also, an inverter 38 that inverts the window pulse 11 is provided. To the selector 36, the output signal of the inverter 38 and window pulse 11 are input.

In the counter 6 thus composed, "0" is substituted when the value reaches the maximum value MAX. Also, when the output of the subtracter 3 is "0", the center value "MAX/2" is substituted for to the selector 33 of the counter 6 by load signal 8 output from the comparator 13, so, window pulse 11 is toggled when the counter value 10 reaches the maximum value MAX.

The operation of VFO in this embodiment composed as described above is explained below.

In this embodiment, when the transfer rate of playback data is 500 kbps and the frequency of system clock 12 is 12 MHz, the counter 6 operates as a duodecimal counter, the cycle comes to coincide when the window pulse 11 is inverted every time the counter makes a round. When there is no peak shift, a phase relation that input data 1 occurs when the counter value is five is ideal.

Here, the decoder 4 outputs "+1" when the subtraction result of the subtracter 3 is positive, and outputs "−1" when the subtraction result is negative. Also, the shift register 5 is a shift register to store 5 values. The reference value N when the MAX value generating circuit 7 changes the maximum value MAX is ±3.

Under the above conditions, the operation of frequency correction is explained below.

Figure 5:
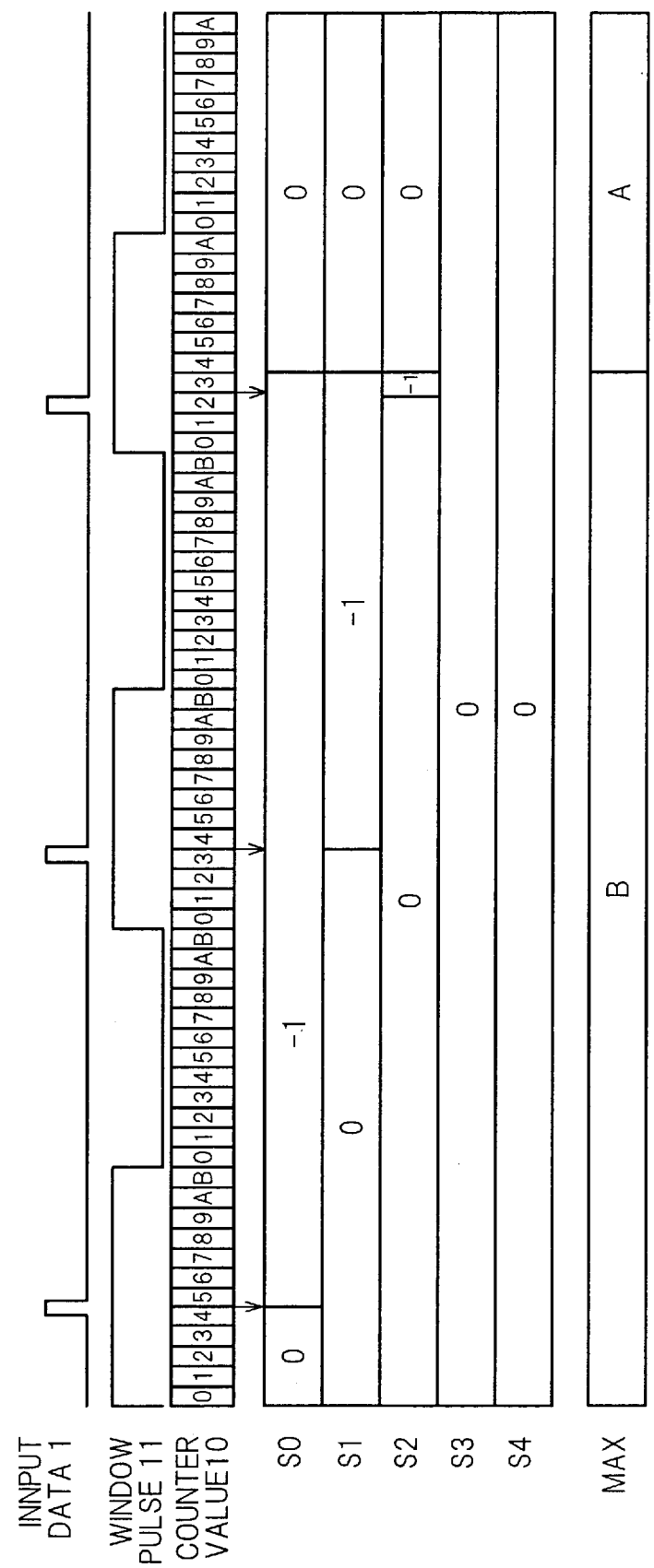
FIG. 5 is a timing chart showing the operation of frequency correction.

FIG. 5 is a timing chart showing the operation of frequency correction. In FIG. 5, S0 to S4 are values in the (started from the lowest-order digit) first to fifth digits, respectively, of the shift register 5.

If the counter value is 5 when input data arises first and the counter value is 4 when input data arises next, then "5" is stored into the high-order digit of the shift register 2 and "4" is stored in the low-order digit. Therefore, output of the subtracter 3 is "−1" from calculation (4−5=−1). Thereby, "−1" is stored into the lowest-order digit of the shift register 5. Thereafter, each time input data is input, a new value is stored into the lowest-order digit of the shift register 5, and when the sum reaches "−3", the cycle of the counter 6 reduces by "1". Namely, the MAX value generating circuit 7 makes the maximum value MAX change from "B" to "A", and therefore the next value to "A" becomes, as shown in FIG. 5, "0" while the next value to "A" in the counter value 10 was "B" thus far.

Meanwhile, if the counter value is "6" when input data arises the next time, then output of the subtracter 3 is "1" from calculation (6−5=1) and "+1" is stored into the lowest-order digit of the shift register 5. Thereafter, each time input data is input, a new value is stored into the lowest-order digit of the shift register 5, and when the sum reaches "3", the cycle of the counter 6 increases by "1".

The operation of phase correction is explained below.

Figure 6:
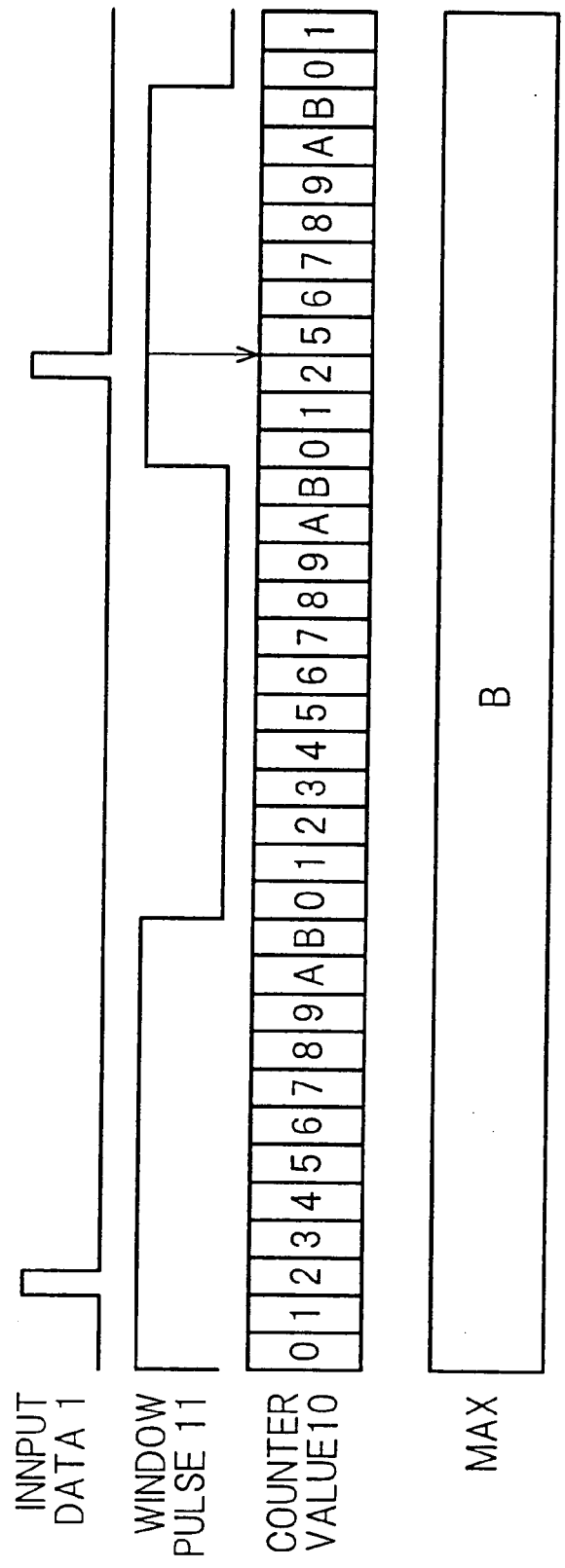
FIG. 6 is a timing chart showing the operation of phase correction.

FIG. 6 is a timing chart showing the operation of phase correction. When values stored in the low-order digit and high-order digit of the shift register 2 come to coincidence and therefore output of the subtracter 3 is zero, it is proved that the cycle of window pulse 11 coincides with that of input data 1 and only the relation of phase is not in coincidence. Therefore, in this case, as shown in FIG. 6, the center value is substituted instantly for the counter value 10 from the counter 6.

Thus, in this embodiment, by the frequency correction and phase correction explained above, an ideal window pulse that is not influenced by peak shift can be generated. This is because the peak shift occurs always yielding a pair, a value of the subtracter 3 yielded by one of peak shifts has a sign opposite to that yielded by the other of peak shifts, and these cancel out when the values of the shift register 5 are summed. Also, since peak shifts in the same direction do not occur continuously, the output of the subtracter 3 does not become zero to two-sequences of input data including the peak shifts. Thus, there occurs no phase correction influenced by the peak shift.

In the conventional VFO that, each time input data arises, resets the counter value to catch input data always at the center of window pulse, it is impossible to play back data correctly when the size of peak shift is more than 25% of the high width of the window pulse. In contrast, VFO in this embodiment does not react with the peak shift instantly and therefore can be applied even to the amount of peak shift of more than 25%.

Also, in the conventional VFO, only the phase correction is conducted and the oscillation cycle of window pulse is constant. Therefore, when input data has a deviation from the ideal frequency, the apparent size of peak shift changes so that the correct decoding is further difficult to conduct. For example, even when the size of peak shift itself is 20% of the high width of window pulse, if 5% of frequency deviation due to rotation deviation of disk drive or the like is included, the apparent size of peak shift becomes 25% given that previous data not peak-shifted is taken to the center of window pulse. Thus, it is impossible to conduct the correct decoding.

In contrast, in this embodiment, bit where the peak shift exists is not taken to the central position, and it is handled by the frequency correction.

When a deviation in frequency occurs, if the correction of frequency is not conducted within a certain bit number, then the deviation in frequency is accumulated, thereby causing the window pulse to deviate from input data when the peak shift occurs. For example, when the size of peak shift is 20% of the high width of window pulse and a deviation in frequency included is 5%, the correction has to be conducted within a bit number less than a bit number of n to satisfy expression 1 below:

$$50\% = 20\% + 5\% \times n(bit) \qquad [1]$$

Thus, the bit number is "6". So, if the frequency correction is conducted within 5 bits, then no deviation of window pulse from input data indicated above occurs. In this embodiment, the reference value N of correction is +3 and therefore the deviation can be settled sufficiently.

In general, variation in drive rotation is estimated within 2%. Variation to the length of window pulse is within 4% that is twice the former variation. Taking the mechanical difference between a drive to write data and a drive to read data into account, it is expected that a deviation in frequency of 8% at the maximum occurs to the high width of window pulse. Even when such size of variation infrequency occurs within one bit, this embodiment where the reference value of correction is 3 can be applied to a peak shift with a size of p to satisfy expression 2 below:

$$50\% = p\% + 8\% \times 3(bit) \qquad [2].$$

Thus, the size p of peak shift applicable is 26%. This is such a size of peak shift that can be applied to when the variation of frequency occurs abruptly. But, the actual variation of frequency occurs not at abrupt speed but in gradual changing, therefore, in such a case, a further big peak shift can be applied to.

On the other hand, in the conventional VFO, regardless of whether the variation of frequency occurs abruptly or not, when the sum of size of peak shift and size of frequency variation is more than half of window pulse, the correction cannot be conducted sufficiently any more.

In the above embodiment, "+1" or "−1" is output from the decoder 4 according to the sign of output of the subtracter 3. However, as described above, the output of the decoder 4 may be weighted according to the value of subtraction result of the subtracter 3. Especially when the size of peak shift included in input data sequence is small and it is rather desirable to respond quickly to the frequency variation, the weighting is more advantageous.

For example, in FIG. 3, a value output from the subtracter 3 may be substituted for, as output of the decoder 4, into the shift register 5.

When the frequency of system clock 12 is 12 MHz and the transfer rate of input data 1 is 500 kbps, it is the ideal operation in case of no peak shift that as described earlier, the counter 6 operates as a duodecimal counter. Here, the reference value N when the maximum value MAX is changed is 3. Also, the shift register 5 is a shift register to store 5 values.

When there occurs such a frequency variation that the counter value in the inputting of input data 1 changes abruptly from "5" to "7" or from "7" to "9", it is difficult to adjust the frequency quickly to a big variation of frequency, by using only the output, "+1" or "−1", of the decoder 4 described earlier in the embodiment. Even in this case, when the output of the decoder 4 is weighted, the correction of frequency can be conducted at such a frequency that is one time every two bits to a frequency variation of "2" as counter value and is one time every bit to a frequency variation of "3" as counter value. As a result, it can respond to a big frequency variation quickly.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A digital variable oscillator, comprising:
    a cycle change detecting means for detecting a change of cycle between two values of an input data;
    a decoder that outputs a predetermined signal in relation to the detection result of said cycle change detecting means;
    an adding means for adding a signal output from said decoder a predetermined number of times;
    a frequency adjusting means for adjusting a frequency of a window signal in relation to the addition result of said adding means; and
    a phase adjusting means for adjusting a phase of said window signal, by receiving the detection results of said cycle change detecting means and outputting a load signal to said frequency adjusting means when a cycle of said window signal corresponds to the cycle of said input data such that said input data is input to said frequency adjusting means substantially at a timing corresponding to half of the cycle of said window signal.

2. A digital variable oscillator, according to claim 1, wherein:
    said cycle change detecting means comprises a register that stores respective counter values of said input data, and a subtracter that calculates a difference between the respective counter values stored in said register.

3. A digital variable oscillator, according to claim 2, wherein:
    said decoder outputs a signal to indicate either of two positive and negative values in relation to a sign of the subtraction result of said subtracter.

4. A digital variable oscillator, according to claim 2, wherein:

said decoder outputs the subtraction result of said subtracter.

5. A digital variable oscillator, according to claim 2, further comprises:

a phase adjusting means that makes said input data rise when the subtraction result of said subtracter is zero.

6. A digital variable oscillator, comprising:

a cycle change detecting means for detecting a change of cycle between two values of an input data;

a decoder that outputs a predetermined signal in relation to the detection result of said cycle change detecting means;

an adding means for adding signal output from said decoder a predetermined number of times;

a frequency adjusting means for adjusting a frequency of a window signal in relation to the addition result of said adding means; and said cycle change detecting means comprises a register that stores respective counter values of said input data, and a subtracter that calculates a difference between the respective counter values stored in said register.

7. A digital variable oscillator, according to claim 6, wherein:

said decoder outputs a signal to indicate either of two positive and negative values in relation to a sign of the subtraction result of said subtracter.

8. A digital variable oscillator, according to claim 6, wherein:

said decoder outputs the subtraction result of said subtracter.

9. A digital variable oscillator, according to claim 6, further comprises:

a phase adjusting means for adjusting a phase of said window signal, by receiving the detection results of said cycle change detecting means and outputting a load signal to said frequency adjusting means when a cycle of said window signal corresponds to the cycle of said input data such that said input data is input to said frequency adjusting means substantially at a timing corresponding to half of the cycle of said window signal.

* * * * *